United States Patent [19]

Hoefer et al.

[11] Patent Number: 4,529,762
[45] Date of Patent: Jul. 16, 1985

[54] MIXED EMULSIFIER FOR EMULSION POLYMERIZATION

[75] Inventors: Rainer Hoefer, Duesseldorf; Karl Schmid, Mettmann; Bernd Wegemund, Haan; Bernhard Bartnick, Monheim-Baumberg, all of Fed. Rep. of Germany

[73] Assignee: Henkel Kommanditgesellschaft auf Aktien, Duesseldorf, Fed. Rep. of Germany

[21] Appl. No.: 662,473

[22] Filed: Oct. 18, 1984

[30] Foreign Application Priority Data

Oct. 29, 1983 [DE] Fed. Rep. of Germany ....... 3339407

[51] Int. Cl.$^3$ ............................................. C08K 5/42
[52] U.S. Cl. .................................... 524/157; 524/158; 524/161; 524/166; 524/560; 524/562; 524/564
[58] Field of Search ............... 524/157, 158, 161, 166, 524/560, 562, 564

[56] References Cited

U.S. PATENT DOCUMENTS

| 3,732,178 | 5/1973 | Kuhnen | 524/424 |
| 4,021,460 | 5/1977 | Ogoshi et al. | 260/400 |
| 4,143,020 | 3/1979 | Emmons et al. | 526/81 |
| 4,286,078 | 8/1981 | Bötsch et al. | 526/344.2 |

FOREIGN PATENT DOCUMENTS

| 3123681 | 3/1982 | Fed. Rep. of Germany . |
| 3047897 | 7/1982 | Fed. Rep. of Germany . |
| 2089793 | 6/1982 | United Kingdom . |

Primary Examiner—Paul R. Michl
Assistant Examiner—J. M. Reddick
Attorney, Agent, or Firm—Ernest G. Szoke; Henry E. Millson, Jr.; Mark A. Greenfield

[57] ABSTRACT

Compositions and processes for the aqueous emulsion polymerization of ethylenically unsaturated monomers using mixed emulsifiers containing (a) about 99.5 to about 10 parts by weight of an α-sulfocarboxylic acid alkyl ester containing from 8 to 24 carbon atoms in the carboxylic acid portion and from 1 to 4 carbon atoms in the alcohol portion, and (b) from about 0.5 to about 90 parts by weight of an α-sulfocarboxylic acid containing from 8 to 24 carbon atoms, and if desired, other anionic and/or non-anionic emulsifiers and/or protective colloids; the mixed emulsifier optionally being completely or partly present in salt form.

9 Claims, No Drawings

MIXED EMULSIFIER FOR EMULSION POLYMERIZATION

BACKGROUND OF THE INVENTION

1. Field of the Invention

This invention relates to a new process for the production of polymer dispersions of low surface tension. The process of the invention utilizes a mixed emulsifier of α-sulfocarboxylic acids and esters thereof.

2. Description of the Relevant Art

Emulsion polymerization processes in which α-sulfofatty acids or esters thereof with lower alcohols are used as emulsifiers are already known. Thus, U.S. Pat. No. 2,694,052 describes the use of sulfonated and sulfated fatty acid esters in the homopolymerization of vinyl acetate in the presence of molecular weight regulators and inorganic cyanides. Although stable polymer dispersions (emulsions) are obtained in this process, there is nothing in this U.S. patent to suggest that a wide range of applications are possible for mixed emulsifiers of α-sulfocarboxylic acids and their esters.

The use of sulfofatty acids containing less than 10 carbon atoms in an emulsion polymerization process for the production of PVC is described in German Pat. No. 842 119. According to the teachings of this German patent, however, only coarsely dispersed suspensions are obtained. There is no reference therein to the use of a combination of the acids with their esters. German Applications No. 17 20 430 and No. 19 01 493, both of which relate to processes for the production of PVC in the presence of α-sulfofatty acids, do not suggest any advantage for using α-sulfocarboxylic acids in combination with their esters.

Finally, German Application No. 20 15 660 relates to a process for the production of speck-free, hot-polymerized plastics dispersions of high surface tension, in which α-sulfofatty acids or α-sulfofatty acid esters each containing from 10 to 20 carbon atoms in the acid residue and up to 3 carbon atoms in the alcohol residue are used as the polymerization emulsifier. Although α-sulfocarboxylic acids and also their esters are mentioned as polymerization emulsifiers in this German Application, their combined use is neither described nor suggested. This is also apparent from the fact that while it has now surprisingly been found that the combined use of α-sulfocarboxylic acids and their esters in the emulsion polymerization process leads to dispersions of low surface tension, while the use of the individual components according to the prior art leads to dispersions of high surface tension. There is also nothing in this German Application to suggest other advantages of using the emulsifier combination, which have been discovered by the present invention, such as for example improved stability in storage.

DESCRIPTION OF THE INVENTION

Accordingly, one object of the present invention is to provide an improved process for the production of polymer dispersions of low surface tension, in which emulsifiers based on α-sulfocarboxylic acids in combination with esters thereof are used.

Another object of the invention is to provide a process for the production of particularly stable polymer dispersions containing α-sulfocarboxylic acids and esters thereof as emulsifiers.

Accordingly, the present invention relates to a process for the production of stable polymer dispersions of low surface tension by the emulsion polymerization of ethylenically unsaturated monomers in the presence of a mixed emulsifier containing (a) from about 99.5 to about 10 parts by weight of an α-sulfocarboxylic acid alkyl ester containing from 8 to 24 carbon atoms in the carboxylic acid portion and from 1 to 4 carbon atoms in the alcohol portion, and (b) from about 0.5 to about 90 parts by weight of an α-sulfocarboxylic acid containing from 8 to 24 carbon atoms and, if desired, other anionic and/or non-anionic emulsifiers and/or protective colloids; the mixed emulsifier optionally being completely or partly present in salt form.

Accordingly, the process of the invention is carried out using the mixed emulsifier described above. The other process parameters can readily be adapted to meet particular requirements and can readily be selected by those skilled in this art using existing knowledge of emulsion polymerization. Specialized information on the subject of emulsion polymerization can be found, for example, in E. W. Duck, Encyclopedia of Polymer Science and Technology, Vol. 5, pages 801–856, John Wiley and Sons, New York 1966 and in the literature cited therein. See also F. Holscher, Dispersionen Synthetischer Hochpolymerer, Part 1, Springer Verlag, Berlin/Heidelberg/New York (1969), and K. O. Calvert (Editor), Polymer Latices and their Applications, Applied Science Publishers Ltd., London, 1982.

Methods for preparing the constituents of the mixed emulsifier used in the process of the invention are known. Thus, the production of α-sulfocarboxylic acids is described in U.S. Pat. No. 2,460,968, in which aliphatic acids containing at least 6 carbon atoms are sulfonated with chlorosulfonic acid in a solvent. A slight excess of chlorosulfonic acid is used and any gases formed (HCl) are subsequently removed, together with the solvent, by distillation.

The production of α-sulfocarboxylic acid esters is described in German Application No. 11 86 051 and also in German Pat. No. 1,248,645 or in German Application No. 30 47 897. Finally, a process for the production of α-sulfofatty acid ester salts is described in German Pat. No. 2,544,846, according to which from 0.5 to 10% by weight of an inorganic sulfate in the form of a powder free from water of crystallization is added to 100 parts by weight of an alkyl ester of a saturated fatty acid, the fatty acid portion of which contains from 8 to 22 carbon atoms and the alcohol portion from 1 to 6 carbon atoms, followed by the introduction of from 1 to 2 moles (per mole of fatty acid ester) of gaseous $SO_3$ in admixture with an inert gas at temperatures of up to at most 100° C. Salts of α-sulfofatty acid esters which may be made up in the form of highly concentrated solutions in water and which contain at most small quantities of free acids can be obtained by the process of German Application No. 31 23 681 which describes the subsequent esterification of the sulfonated product by the addition of alcohol before neutralization. It is apparent from German Application No. 31 23 681 that efforts were being made in this field to produce α-sulfofatty acid esters in the purest possible form, i.e., completely free from any traces of α-sulfofatty acids.

The constituents of the emulsifier mixture used in the polymerization process of the invention can be obtained from any long-chain carboxylic acids ($C_8$–$C_{24}$) using the processes described above. However, it is preferred to use α-sulfoesters and acids based on naturally occurring fatty acids, particularly saturated fatty acids. Thus, the constituents of the mixed emulsifier can be produced from pure straight-chain $C_8$, $C_{10}$, $C_{12}$, $C_{14}$, $C_{16}$, $C_{18}$, $C_{20}$ or $C_{24}$-alkyl carboxylic acids. However, it is particularly preferred to produce the components of the mixed emulsifier from saturated esters of naturally occurring fatty acids. Particularly suitable raw materials are hydrogenated coconut oil fatty acid or hydrogentated tallow fatty acid. The hydrogenated coconut oil fatty acid can also be replaced by hydrogenated palm kernel oil fatty acid. The hydrogenated fatty acids can be used either as such or in fractionated form. If it is intended to produce $\alpha$-sulfofatty acids or esters thereof containing from 18 to 22 carbon atoms, the hardening product of a rapeseed oil rich in erucic acid is preferably used as the starting material.

The constituents of the mixed emulsifier used in accordance with the invention can also be produced from synthetic carboxylic acids containing from 8 to 24 carbon atoms and, more particularly, from unbranched synethetic carboxylic acids.

The mixed emulsifiers used in accordance with the invention can be produced by mixing $\alpha$-sulfocarboxylic acid esters with $\alpha$-sulfocarboxylic acids. However, it is preferred to start with $\alpha$-sulfocarboxylic acid esters and to produce the required proportion of free acids in situ by partial hydrolysis of the ester function. Partial hydrolysis of the ester function can be carried out before or during neutralization. The degree of hydrolysis can be determined by the quantities of alkali used and/or by titration of free carboxylic acid groups or by spectroscopy.

The process of the invention uses $\alpha$-sulfocarboxylic acid esters containing from 1 to 4 carbon atoms in the alcohol function of the ester. Suitable esters are, in particular, methyl, ethyl, propyl, isopropyl and butyl esters, although esters or partial esters of ethylene glycol, propylene glycol, glycerol or trimethylol propane can also be used.

As stated above, mixed emulsifiers of from about 99.5 to about 10 parts by weight of an $\alpha$-sulfocarboxylic acid alkyl ester and from about 0.5 to about 90 parts by weight of an $\alpha$-sulfocarboxylic acid are used. The sulfocarboxylic acid ester content is preferably between about 95 and about 50% by weight and, more preferably, between about 90 and about 70% by weight, corresponding to an acid content of preferably from about 5 to about 50% by weight and, more preferably, from about 10 to about 30% by weight.

In the process, the mixtures are either used as such, i.e., the emulsifiers are premixed, or if desired both emulsifiers are dissolved either separately or together in the monomer phase or in the aqueous phase. It is also possible to dissolve the ester in the monomer phase and the acid in the aqueous phase and vice versa. It is preferred not to use the free acids, but rather their salts or, in the case of the $\alpha$-sulfocarboxlic acids, the di salts. Thus, the emulsifier can be completely or partly present in the form of the sodium salt, potassium salt, lithium salt, magnesium salt, calcium salt or ammonium salt. Amine salts of the emulsifier mixtures are also suitable emulsifiers. Thus, triethylamine salts, tetramethyl ammonium salts and, in particular, alkanolamine salts, for example dimethyl ethanolamine salts or triethanolamine salts, can be used. The salts of tris-hydroxy methylene methyl amine or of 2-methyl-2-aminopropanol or propane diol can also be used.

The emulsifier mixture of the invention is used in quantities of from about 0.5 to about 7% by weight or even in quantities of up to about 10% by weight, but preferably in quantities of from about 1 to about 5% by weight and, more preferably, in quantities of from about 1.5 to about 3% by weight, based on the weight of the polymer emulsion. The quantity of emulsifier used is determined by the monomers used, the other process parameters, and the desired properties of the polymer dispersion. Thus, finer dispersions are often obtained where relatively very large quantities of emulsifier are used.

Although the emulsifier mixture shows very favorable properties when used alone, other anion-active co-emulsifiers may also be used. Suitable co-emulsifiers of this type are paraffin sulfonates, alkyl benzene sulfonates, alkyl naphthalene sulfonates, soaps of linear and branched, saturated and unsaturated fatty acids, fatty alcohol and synthetic alcohol sulfates, alkyl diphenyl disulfonates, sulfosuccinic acid mono and diesters of linear, branched and cyclic alcohols and, quite generally, sulfates, sulfonates, sulfosuccinates, isethionates, phosphates and ether carboxylic acids of the non-ionic emulsifiers mentioned hereinafter. Where the mixed emulsifier is used together with other anionic emulsifiers, it is preferred to keep the total quantity of emulsifier below about 5% by weight, based on monomer. In another embodiment of the process of the invention, the emulsifier mixture of the invention is used in combination with non-ionic co-emulsifiers. This gives dispersions characterized by increased resistance, for example, to shear forces, temperature and electrolytes. The non-ionic emulsifiers are added in quantities of from about 0.5 to about 5% by weight, and preferably in quantities of from about 1 to about 3% by weight, based on monomer. It is possible in the process of the invention to introduce the non-ionic emulsifiers at the beginning of polymerization or, alternatively, to introduce them during the course of the polymerization. In another procedure, a pre-emulsion is prepared using the non-ionic emulsifiers either alone or in admixture, and adding the pre-emulsion during the course of polymerization. It is also possible to add non-ionic emulsifiers to stabilize the dispersions produced in accordance with the invention. Suitable non-ionic emulsifiers for use herein include:

linear, branched, cyclic, saturated and unsaturated alkyl polyglycol ethers, particularly fatty alcohol polyglycol ethers, mono-, di- and trialkylaryl polyglycol ethers, particularly, for example, octyl and nonyl phenol polyglycol ether, dinonylphenol polyglycol ether, triisobutyl phenol polyglycol ether, arylpolyglycol ethers, for example, the reaction product of phenol with from 3 to 10 moles of ethylene oxide, polyglycol ethers of hydroxy alkanols, as described in German Patent Application No. 33 19 782.2, carboxylic acid polyglycol esters, particularly fatty acid polyglycol esters, fatty acid alkanolamide-EO-adducts, particularly coconut oil fatty acid monethanolamide-EO-adducts, EO/PO-block polymers, for example, Pluronics ® and Tetronics ®, ethoxylated sorbitan esters, particularly sorbitan monolaurate+20 EO ethoxylated fatty amines.

In another embodiment of the process of the invention, the emulsifier mixture can also be used together with protective colloids. Suitable protective colloids are, for example, completely or partially hydrolyzed homopolymers and/or copolymers of vinyl acetate, such as for example partially hydrolyzed polyvinyl acetate or completely hydrolyzed copolymers of vinyl acetate and vinyl ethers. Preferred copolymers contain from 1 to 4 carbon atoms in the ether portion of the polyvinyl ether. Other protective colloids are derived, for example, from polysaccharides. Thus, cellulose ethers, such as hydroxyethyl cellulose, hydroxypropyl cellulose, carboxymethyl cellulose, methyl cellulose or mixed ethers, are particularly suitable. Polyacrylamide and its copolymers with acrylic acid, acrylonitrile or acrylic esters are also suitable. Condensation products of naphthalene sulfonic acid and formaldehyde or other water-soluble formaldehyde resins, for example, urea-formaldehyde resins, can also be used. Finally, casein, gelatin, gum arabic, natural and substituted starch derivatives, such as hydroxyethyl starch, are suitable protective colloids.

In accordance with the invention, so-called copolymerizable emulsifiers—more properly reffered to as stabilizing monomers—can also be used in combination with the mixed emulsifiers for the production of dispersions. Suitable stabilizing monomers are vinyl sulfonate, allyl sulfonate, 2-acrylamido-2-methyl propane sulfonic acid, vinyl phosphonic acid, and the acrylic and methacrylic esters of non-ionic emulsifiers or styrene sulfonic acid.

Almost any commercially important monomers substantially insoluble in water can be processed into dispersions by the process of the invention. Thus, the process of the invention is suitable for the emulsion polymerization of aromatic vinyl compounds, such as styrene, divinyl benzene or vinyl toluene; of polymerizable olefins and diolefins, such as propene, butadiene or isoprene; of esters of acrylic acid or methacrylic acid with linear or branched chain alcohols containing from 1 to 18 carbon atoms, particularly alcohols containing from 1 to 8 carbon atoms, and preferably of methyl, ethyl and butyl esters thereof. In accordance with the invention, vinyl esters of acids containing from 2 to 12 carbon atoms, particularly vinyl acetate, vinyl propionate and vinyl-2-ethylhexanoate, can also be subjected to emulsion polymerization. Other suitable vinyl compounds are vinyl alkyl ethers containing $C_1$–$C_8$-alkyl groups. Vinyl chloride and vinylidene chloride are also suitable monomers. The above-mentioned monomers can be subjected to homopolymerization or copolymerization with other compounds of the type mentioned above in the presence of the mixed emulsifiers of the invention. It is also possible to carry out copolymerizations in which up to 50% by weight of other monomers partly or completely soluble in water are present. Suitable monomers of this type are acrylonitrile, methacrylonitrile, semiesters of maleic acid and fumaric acid containing from 1 to 8 carbon atoms, acrylic acid, methacrylic acid, maleic acid, fumaric acid, crotonic acid and/or itaconic acid.

The dispersions prepared in accordance with the invention have a ratio by weight of monomer to water of from about 1:5 to about 2:1 and preferably from about 1:3 to about 1:1.

According to the invention, it is also possible to use other standard polymerization auxiliaries, predominantly polymerization initiators, such as inorganic peroxide compounds, for example, potassium or ammonium persulfate or hydrogen peroxide. It is also possible to use organic peroxide compounds or organic azo compounds provided they are suitable for emulsion polymerization. The initiators are used in their usual quantities, i.e., in quantities of from about 0.05 to about 2% by weight and preferably in quantities of from about 0.1 to about 0.5% by weight. Other auxiliaries include buffers, such as sodium hydrogen carbonate, sodium phyrophosphate or sodium acetate which may be used in quantities of up to about 2% by weight. Accelerators, such as formaldehyde sulfoxylate, may also be used. The molecular weight regulators normally used for emulsion polymerization, for example butenol or organic thio compounds, such as mercaptoethanol, thioglycolic acid, octyl mercaptan or tert.-dodecyl mercaptan, may also be used. The process of the invention can be carried out using any of the various techniques normally used for emulsion polymerization, including for example total input, monomer input or emulsion input. In general, the temperature of the polymerization medium is kept in the range of from about 40° to about 100° C. and preferably in the range of from about 50° to about 90° C. The polymerization process is preferably carried out at a pH-value in the range of from about 3 to about 9.

The process of the invention is preferably carried out in coolable and heatable vessels equipped with a stirrer and temperature gauge, for example, in stirrer-equipped pressure vessels. However, the use of tubular coil reactors or so-called loop reactors is also possible.

On completion of polymerization, the polymer dispersion is preferably cooled and discharged from the vessel through sieves. If the solid product is to be isolated, the polymer dispersion is precipitated or spray-dried. However, it is preferred to use the dispersions directly as binders for paints, adhesives and other coating compositions.

The use of the mixed emulsifiers as anionic sole emulsifiers in accordance with the invention for emulsion polymerization leads to polymer dispersions which show improved stability by comparison with those based, for example, on n-dodecyl benzene sulfonate or fatty alcohol sulfates. In addition, the emulsifier mixture enables the particle sizes to be controlled within wide limits through appropriate adjustment of the quantitative ratio between α-sulfocarboxylic acid ester and α-sulfocarboxylic acid. Dispersions of low surface tension which can be used, for example, as foam latices are obtained. The combination of the mixed emulsifiers of α-sulfocarboxylic acids esters and α-sulfocarboxylic acids with nonionic co-emulsifiers leads to dispersions characterized by increased resistance, for example to shear forces, temperature and electrolytes.

The invention will be illustrated but not limited by the following examples:

EXAMPLES

Tested emulsifiers of the invention

1. Mixture of α-sulfo-$C_{12}$-fatty acid, di-Na-salt and α-sulfo-$C_{12}$-fatty acid methyl ester, Na-salt, in a ratio of 22:88 in the form of a 39.4% aqueous solution.

2. Mixture of α-sulfo-$C_{12}$/$C_{18}$-fatty acid, di-Na-salt and α-sulfo-$C_{12}$/$C_{18}$-fatty acid methyl ester, Na-salt, in a ratio of 19.6:80.4 in the form of a 36.9% aqueous solution.

3. Mixture of α-sulfo-$C_{16}$/$C_{18}$-fatty acid *, di-Na-salt and α-sulfo-$C_{16}$/$C_{18}$-fatty acid methyl ester, Na-salt, in a ratio of 3.3:96.7 in the form of a 28.7% aqueous solution.

* Obtained from hardened tallow fatty acid

4. Mixture of α-sulfo-$C_{16}$/$C_{18}$-fatty acid *, di-Na-salt and α-sulfo-$C_{16}$/$C_{18}$-fatty acid methyl ester *, Na-salt in a ratio of 17.2:82.8 in the form of a 28.5% aqueous solution.
* Obtained from hardened tallow fatty acid 5. Same as 4, mixing ratio 18.7:81.3 in the form of a 29.4% aqueous solution.

6. Same as 4, mixing ratio 20:80 in the form of a 30% aqueous solution.

7. α-sulfo-$C_{16}$/$C_{18}$-fatty acid in admixture with its methyl ester (20:80 mole percent) in the form of the magnesium salt.

EXAMPLE 1 n-Butylacrylate homopolymer

Initial reactor charge 446.8 g of fully deionized water
1.0 g of potassium peroxodisulfate
12.2 g of emulsifier of the invention Catalyst input 1.0 g of sodium disulfate
49.0 g of water Monomer input 480.0 g of butylacrylate
10.0 g of acrylic acid Addition to the prepared polymer dispersion 10.0 g of ammonia to adjust the pH to approx. 7–8.

Apparatus

The polymerization reaction was carried out in the absence of pressure in a 2 liter glass autoclave equipped with an anchor stirrer.

Procedure used

Introduced initial reactor charge
Added 10% of the catalyst input and 10% of the monomer input
Heating bath heated to 75° C.
Polymerization began at 60° to 65° C. (exothermic)
Added the remainder of the catalyst and monomer at the same time
Addition time was approximately 1 hour, 30 minutes On completion of the monomer/catalyst addition, the mixture was polymerized for about 2 hours at a heating bath temperature of 90° C. (internal reactor temperature approximately 80° C.)
Cooled to <30° C.
At approximately 30° C., the polymer dispersion was adjusted with ammonia (25%) to a pH-value of approximately 7–8.

| Tested emulsifier | Evaluation Coagulate | Shelf life |
|---|---|---|
| 1 | <0.1% | 3 weeks |
| 3 | <0.1% | 3 weeks |
| 6 | <0.1% | 3 weeks |
| Comparison Examples: | | |
| n-Dodecylbenzene sulfonate, 75% paste | <0.1% | 24 hours |
| n-Dodecylbenzene sulfonate, 96% powder | <0.1% | 24 hours |
| $C_{14}$/$C_{18}$—alkane sulfonate, Na-salt | <0.1% | 2–3 days |

EXAMPLE II n-Butylacrylate homopolymer

The procedure was as in Example I except that, after neutralization, the dispersions were stabilized with 40 g of a 25% aqueous solution of nonyl phenol+10 EO (non-ionic emulsifier).

| Tested emulsifier: | Evaluation | | | | | |
|---|---|---|---|---|---|---|
| | 1 | 2 | 3 | 4 | 6 | 7 |
| % Dry residue | | | | | | |
| Theoretical | 49.2 | 49.2 | 49.2 | 49.2 | 49.2 | 49.2 |
| Observed | 49.6 | 49.7 | 49.1 | 49.0 | 49.1 | 48.3 |
| % of coagulate after polymerization | 0 | 0 | 0 | 0 | 0.2 | 3 |
| Particle size (Coulter Nano-Sizer) in nanometers | 101 | 113 | 108 | 103 | 102 | 200* |
| Polymer dispersity | 2–3 | 3 | 3–4 | 2–5 | 2–3 | — |
| Mechanical stability | | | | | | |
| min | 30 | 30 | 30 | 30 | 30 | — |
| % coagulate | 0 | 0 | 0 | 0 | 0 | — |
| Brookfield viscosity at 25° C. | | | | | | |
| spindle No. | 3 | 3 | 3 | 3 | 2 | — |
| r.p.m. | 20 | 20 | 20 | 20 | 20 | — |
| mPa · s | 2800 | 950 | 1650 | 2600 | 300 | — |
| pH-value | 7.6 | 8.2 | 7.5 | 7.3 | 8.4 | 8.0 |
| Shelf life in months | >6 | >6 | >6 | >6 | >6 | >2 |

*Particle size as determined with an electron microscope, surface tension 34.7 m·$^V$/m In a comparison test using the above procedure, an α-sulfo-$C_{16}$/$C_{18}$-fatty acid-di-Na-salt free from α-sulfomethyl ester was used as emulsifier in the same concentration and subsequently stabilized in the same way with nonyl phenol+10 EO gave a non-shear-resistant dispersion with a considerably shorter shelf life of only about 4 weeks.

EXAMPLE IIa n-Butylacrylate homopolymer

The procedure of Example II was repeated with mixtures of (a) α-sulfo-$C_{12}$/$C_{18}$-fatty acid, di-Na-salt, and (b) α-sulfo-$C_{12}$/$C_{18}$-fatty acid methyl ester, Na-salt, in different mixture ratios. The particle size of the latex particles formed was determined with a Coulter-Nano-Sizer.

The following Table illustrates the dependence of the latex particle diameter upon the mixing ratio and, hence, the controllability of that parameter by variation of the emulsifier mixture.

| Mixture ratio of α-sulfo-$C_{12}/C_{18}$-fatty acid, di-Na-salt and α-sulfo-$C_{12}/C_{18}$-fatty acid methyl ester, Na-salt | Mixture | Latex particle diameter (nm) |
|---|---|---|
| 3.2:96.8 | a | 99 |
| 7.5:92.5 | b | 123 |
| 20:80 | c | 232 |
| 50:50 | d | 265 |

EXAMPLE III

Vinylacetate-vinylversatate copolymer

Initial reactor charge 250.0 g of fully deionized water  
1.4 g of emulsifier of the invention, 100%  
0.5 g of potassium peroxodisulfate  
0.5 g of borax pH-value approx. 9

Aqueous phase of the monomer pre-emulsion 261.8 g of fully deionized water  
1.8 g of emulsifier of the invention, 100%  
12.0 g of nonionic emulsifier, 100%  
2.0 g of potassium perioxodisulfate  
2.0 g of borax Monomer mixture of the pre-emulsion 343.0 g of vinyl acetate  
141.0 g of VeoVa 10 ® (a Shell product) (vinyl ester of a branched $C_{11}$-carboxylic acid)  
4.0 g of acrylic acid  
pH-value of the prepared polymer dispersion=approx. 4–5

Addition to the prepared polymer dispersion 20.0 g of ammonium carbonate solution, 10% in water  
1040.0 g of polymer dispersion

Apparatus

See Example I

Procedure

The reactor charge was heated to 80° C. and the monomer pre-emulsion was prepared by adding the monomer mixture with stirring to the aqueous phase. The pre-emulsion thus formed should have a pH-value of from 3.8 to 4.0. When the temperature of the reaction mixture reached 80° C., the monomer pre-emulsion was added over a period of two to two and a half hours. On completion of the addition, the temperature of the reaction mixture was kept at 80° C. for another 2 hours. The dispersion was cooled and filtered. The pH-value was adjusted to approx. 7 with a 10% ammonium carbonate solution.

| Evaluation | Tested emulsifiers: | | |
|---|---|---|---|
| Emulsifier of the invention Non-ionic emulsifier | 6 Nonyl phenol + 20 EO | 6 Tallow fatty alcohol + 80 EO | 6 Nonyl phenol + 30 EO |
| % of coagulate after polymerization | 0.1 | 0.1 | 0.1 |
| Particle size of the dispersion in nanometers | approx. 150 | 169 | 149 |
| pH-value | 4.3 | 3.9 | 4.0 |
| Mechanical stability | | | |
| min | 30 | 30 | 30 |
| % coagulate | 0 | 0 | 0 |
| Brookfield viscosity at 25° C., mPa · s | 620 | 404 | 405 |
| % Water uptake | 11.1 | n.d | 11.0 |
| % Swelling | 11.8 | n.d. | 11.7 |
| Electrolyte stability in % coagulate | | | |
| NaCl      1% | 0 | 0 | 0 |
| NaCl     10% | 0 | 100 | 0 |
| $CaCl_2$    1% | 0 | 0 | 0 |
| $CaCl_2$   10% | 0 | 100 | 0 |
| $Pb(NO_3)_2$  1% | 0 | 0 | 0 |
| $Pb(NO_3)_2$ 10% | <50 | 100 | 0 |
| $Al_2(SO_4)_3$  1% | 0 | 0 | 0 |
| $Al_2(SO_4)_3$ 10% | <50 | 100 | 100 |
| Film assessment at room temperature | clear, transparent | clear, transparent | clear, transparent |
| at 105° C. | yellowish, transparent | yellowish, transparent | yellowish, transparent |

EXAMPLE IV

Butylacrylate-styrene-methacrylic acid copolymer

Initial reactor charge 558.0 g of fully deionized water  
2.0 g of ammonium peroxodisulfate  
7.5 g of emulsifier of the invention, 100%

Catalyst input 1.0 g of ammonium peroxodisulfate  
49.0 g of fully deionized water Monomer input 255.0 g of butylacrylate  
225.0 g of styrene  
20.0 g of meacrylic acid Addition to the prepared polymer dispersion Approx. 18.5 g of ammonia, 25%, to adjust the pH-value to approx. 8.

Apparatus see Example I.

Procedure

Introduced initial reactor charge  
Added 10% of the catalyst input and 10% of the monomer input  
Heating bath heated to 90° C.  
Polymerization began at 60° C. (exothermic)  
Added the remainder of the catalyst and the monomer at the same time  
Addition time was approximately 45 mins; after 9/10 of the monomer input had been added, there was a marked increase in viscosity and a distinctly exothermic increase in temperature; the internal reactor temperature rising from approx. 90° C. to 94°–97° C. for a heating bath temperature of 90° C.

On completion of the monomer/catalyst addition, the mixture was polymerized for about 1 to 2 hours at a heating bath temperature of approx. 105° C.

Cooled

At approximately 50° C., the polymer dispersion was adjusted with ammonia (25%) to a pH-value of approximately 8.

The dispersion was filtered through an 80 micron filter bag.

The mixtures used in Example IIa were used as the emulsifiers.

| Mixture | a | c | d | Comparison test: $C_{12}$-fatty alcohol sulfate |
|---|---|---|---|---|
| Particle size (electron microscope (nm)) | 57.7 | 61.8 | 65.2 | 72 |

Test Methods

| Tested emulsifier: | Evaluation | | | | | | | |
|---|---|---|---|---|---|---|---|---|
| | 1 | 2 | 3 | 4 | 5 | 6 | C* | C** |
| % Dry residue | | | | | | | | |
| Theoretical | 45 | 45 | 45 | 45 | 45 | 45 | 45 | 45 |
| Observed | 45.4 | 45.1 | 44.8 | 45 | 45.4 | 44.9 | 45.6 | 44.8 |
| % of coagulate after polymerization | <0.1 | <0.1 | <0.1 | <0.1 | <0.1 | <0.1 | <0.1 | <0.1 |
| Mechanical stability | | | | | | | | |
| min | 30 | 30 | 30 | 30 | 30 | 30 | 30[1] | 30[1] |
| % coagulate | 0 | 0 | 0 | 0 | 0 | 0 | 15[2] | 15[2] |
| Brookfield viscosity at 25° C. | | | | | | | | |
| spindle No. | 3 | 3 | 3 | 3 | 3 | 3 | 1 | 2 |
| r.p.m. (min$^{-1}$) | 20 | 20 | 20 | 20 | 20 | 20 | 20 | 20 |
| mPa · s | 2070 | 1930 | 2270 | 1080 | 2535 | 1060 | 200 | 900 |
| % Water uptake | 6.14 | 6.22 | 6.67 | 6.52 | 6.26 | 6.50 | 6.72 | 6.16 |
| % Swelling | 6.50 | 6.59 | 7.07 | 6.91 | 6.57 | 6.89 | 7.13 | 6.53 |
| pH-value | 9.35 | 9.40 | 9.25 | 9.30 | 9.25 | 9.35 | 9.20 | 9.30 |
| Surface tension of the 45% polymer dispersion in mN/m | 44.2 | 46.2 | 44.4 | 46.5 | 44.9 | 44.6 | 57.8 | 50.1 |

[1] = After 5 minutes
[2] = Vigorous foaming
C* = Comparison Example (1.5% of 100 percent α-sulfofatty acid-di-Na-salt; basis: hydrogenated palm kernel oil fatty acid)
C** = Comparison Example (1.5% of 100 percent α-sulfo-$C_{16}/C_{18}$ (1:1)-fatty acid, di-Na-salt)

As with the monomers in Examples I, II and III, the emulsifiers of the invention also show excellent emulsifying behavior in the copolymerization of styrene and butylacrylate. In particular, they give α-sulfofatty acid-di-Na-salts free from methyl ester sulfonate, lower surface tensions of the dispersion and better mechanical stability of the latices than those of the Comparison Examples.

EXAMPLE V

| Styrene homopolymer/batch process | |
|---|---|
| Ingredients: | |
| Fully deionized water | 473.36 g |
| Emulsifier (100% AS) | 5.24 g |
| 2% aqueous $K_2S_2O_8$-solution | 52.6 g |
| Styrene | 225.0 g |

Apparatus

See Example I

Procedure

The emulsifier or emulsifier mixture was dissolved in the indicated quantity of fully deionized water, the initiator solution was added and the reactor was purged with nitrogen while stirring for 30 minutes at room temperature. Styrene was then introduced and heating commenced. The jacket heating was adjusted to 75° C. The mixture was polymerized in 7 hours at an internal temperature of 70° C.

1. Coagulate content after preparation

The prepared dispersion was poured through a tared Schwegmann Perlon filter bag having a mesh width of 80 microns. The filter bag together with any coagulate present was dried for 24 hours at 105° C. and the coagulate determined by differential weighing.

2. Determination of particle size

Particle size was determined on the following scale:

| Visual: | |
|---|---|
| milky white dispersion | over 1 micron |
| bluish white to brownish-white dispersion | 1 micron to 0.1 micron |
| gray-white, semitransparent dispersion | 0.1 micron to 0.05 micron |
| substantially transparent dispersion | under 0.05 micron |

Determination of the average particle size range by automatic measurement using a Coulter Nano-Sizer
Determination of the particle diameter by TEM (transmission electron microscope) photographs 3. Polymer dispersity Polymer dispersity is a classification based on the particle size distribution of a dispersion. The particle size distribution is given a numerical value of 0 to 9, the value 0 to 1 signifying entirely monodisperse and the value 8 to 9 entirely polydisperse.

4. Dry substance content

Dry residue weighing balance (Satorius type 709301). The solids content was determined at stage 7 (drying time 20 minutes). The weighted quantity amounts to approximately 5 g.

5. pH-value

The pH-value was determined using a standard commercially available pH-meter.

6. Viscosity

Viscosity was measured at 25° C. using a Brookfield type RVT viscosimeter.

7. Mechanical stability 80 g of the dispersion were stirred for 30 minutes at 14,000 r.p.m. using a Klaxon type HM 5 UB 2 stirrer (Klaxon Ltd.) and subsequently filtered through a Schwegmann 80-micron filter bag. The coagulate content was determined by drying and differential weighing of any coagulate remaining in the filter bag (in accordance with ASTM D 1076).

8. Electrolyte stability

Quantities of 10 ml of the following salt (electrolyte) solutions were added to quantities of 10 ml of the undiluted dispersion: Sodium chloride solution 1 percent and 10 percent Calcium chloride solution 1 percent and 10 percent Lead nitrate solution 1 percent and 10 percent Aluminium sulfate solution 1 percent and 10 percent 9. Determination of percentage water uptake and swelling Water uptake:

Three films of the dispersion measuring $75 \times 35 \times 0.5$ mm were tested in each case. The films were identified, dried for 48 hours at 50° C. in a recirculating air oven, subsequently weighed and then stored in deionized water. Depending on requirements, the dispersion films were carefully dried by dabbing with cellulose cloths after storage in the deionized water for 24 hours, 48 hours or x-hours, subsequently weighed and the increase in weight calculated in percent.

Swelling:

The percentage numerical swelling value was calculated as follows:

% swelling = percent by weight water uptake × density the polymer dispersion.

10. Film assessment

Two films were drawn using a drawing rule (gap width approximately 1 mm).

One film was dried for 48 hours at room temperature, the other film for 24 hours at 105° C.

What is claimed is:

1. An aqueous polymer dispersion comprising
   I. a polymer of at least one ethylenically unsaturated monomer, and
   II. an emulsifier mixture containing
   A. from about 99.5 to about 10 parts by weight of at least one α-sulfocarboxylic acid alkyl ester containing from 8 to 24 carbon atoms in the carboxylic acid portion and from 1 to 4 carbon atoms in the alcohol portion, and
   B. from about 0.5 to about 90 parts by weight of at least one α-sulfocarboxylic acid containing from 8 to 24 carbon atoms.

2. An aqueous polymer dispersion in accordance with claim 1 wherein component II is present in from about 0.5 to about 10% by weight, based on the weight of the aqueous polymer dispersion.

3. An aqueous polymer dispersion in accordance with claim 1 wherein component II is present in from about 1 to about 5% by weight, based on the weight of the aqueous polymer dispersion.

4. An aqueous polymer dispersion in accordance with claim 1 wherein component II is present in from about 1.5 to about 3% by weight, based on the weight of the aqueous polymer dispersion.

5. An aqueous polymer dispersion in accordance with claim 1 wherein in component II from about 95 to about 50 parts by weight of ingredient A and from about 5 to about 50 parts by weight of ingredient B are present therein.

6. An aqueous polymer dispersion in accordance with claim 1 wherein in component II from about 90 to about 70 parts by weight of ingredient A and from about 10 to about 30 parts by weight of ingredient B are present therein.

7. An aqueous polymer dispersion in accordance with claim 1 wherein in component II said emulsifier mixture is at least partly in the form of an alkali metal salt, magnesium salt, calcium salt, or an amine or ammonium salt.

8. An aqueous polymer dispersion in accordance with claim 1 wherein component I is a polymer of at least one of an aromatic vinyl compound, a monoolefin, a diolefin, an acrylic or methacrylic acid derivative, a vinyl ester, a vinyl ether, or a vinyl halide.

9. An aqueous polymer dispersion in accordance with claim 1 which also contains at least one of: an anionic coemulsifier, a nonionic coemulsifier, or a protective colloid.

* * * * *